US009575666B2

(12) United States Patent
Bester et al.

(10) Patent No.: US 9,575,666 B2
(45) Date of Patent: *Feb. 21, 2017

(54) EFFICIENT REGISTER PRESERVATION ON PROCESSORS

(71) Applicant: International Business Machines Corporation, Armonk, NY (US)

(72) Inventors: Karla Bester, Ridgewood (AU); Allan T. Chandler, Floreat (AU); Mark A. Shewell, Perth (AU); Stephen J. Yates, Beaconsfield (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/824,298

(22) Filed: Aug. 12, 2015

(65) Prior Publication Data

US 2016/0246513 A1     Aug. 25, 2016

Related U.S. Application Data

(63) Continuation of application No. 14/628,419, filed on Feb. 23, 2015, now Pat. No. 9,389,796.

(51) Int. Cl.

| G06F 12/00 | (2006.01) |
|---|---|
| G06F 3/06 | (2006.01) |
| G06F 9/30 | (2006.01) |
| G06F 9/46 | (2006.01) |

(52) U.S. Cl.
CPC ............ *G06F 3/0611* (2013.01); *G06F 3/064* (2013.01); *G06F 3/0608* (2013.01); *G06F 3/0644* (2013.01); *G06F 3/0673* (2013.01); *G06F 9/30105* (2013.01); *G06F 9/30134* (2013.01); *G06F 9/461* (2013.01)

(58) Field of Classification Search
None
See application file for complete search history.

(56) References Cited

U.S. PATENT DOCUMENTS

| 5,247,519 A | 9/1993 | Snowden et al. |
|---|---|---|
| 6,696,446 B1 | 2/2004 | Jonas et al. |
| 7,032,104 B1 | 4/2006 | Korger |
| 2008/0091920 A1 | 4/2008 | Shaw et al. |
| 2009/0089562 A1 | 4/2009 | Schuchman et al. |

OTHER PUBLICATIONS

U.S. Appl. No. 14/628,419, filed Feb. 23, 2015; Entitled "Efficient Register Preservation on Processors".

*Primary Examiner* — John A Lane
(74) *Attorney, Agent, or Firm* — Edward J. Wixted, III; Andrew G. Morabito

(57) ABSTRACT

In an approach for locating, preserving, and receiving registers, a register located within a central processing unit is modified a preservation bit, wherein the preservation bit designates when the register is to be preserved. The preservation bit of the register is activated. A preservation bit requests a subroutine to access content held on the register. A register is pushed to a memory source. The bitmask is pushed to a memory source, wherein the bitmask contains information regarding the content pushed to the memory source. The bitmask is popped, at the request of the subroutine, to determine that that content is to be popped. The content is popped from the memory source to the register. The content is returned from the subroutine.

7 Claims, 2 Drawing Sheets

EFFICIENT REGISTER PRESERVATION ON PROCESSORS

BACKGROUND OF THE INVENTION

The present invention relates generally to the field of improving the process of saving and restoring registers, and more particularly to preserving registers that do not need to be accessed immediately to free up more storage space.

Central processing units (CPUs) are the hardware within a computer that carry out instructions of computer programs by performing basic arithmetical, logical, control and input/output operations of the system. The fundamental operation of most CPUs, is to execute a sequence of stored instructions called a program. These instructions are stored in memory. The memory can be in many forms such as cache, random access memory (RAM), flash memory, and hard drives. The CPU performs many functions, three of the common functions performed by a CPU are fetch, decode, and execute instructions.

The instructions, instruction set, or instruction set architecture (ISA), is the part of the computer architecture related to programming, including the native data types, instructions, registers, addressing modes, memory architecture, interrupt and exception handling. The instruction includes an operation code (opcode) that specifies the operation to perform, such as add content of memory to registers, which may specify registers, memory location, or literal data. The length of an instruction varies widely, from as little as one bits to many hundreds of bits in some systems.

Computer storage can be in many forms and can be accessed at different speeds. Registers, and cache memory are some of the memory types that can be accessed the fastest, while random-access memory (RAM) and hard drives are each accessed at a much slower rate. The register is the smallest, fastest cache in the system, the registers retrieve information from the main memory instead of store memory. Registers are memory cells built in the CPU that include specific data needed by the CPU. Registers are an integral part of the CPU itself, as the registers provide information for the CPU to process. Such registers are typically accessed by mechanisms other than those used by main memory and can be accessed faster. Registers are measured by the amount of bits they can hold. A bit is a basic unit of information in a computer that is most commonly represented by a "1" or a "0", as used in binary code. The processor uses the registers for quick access to instructions, a storage address, or any other kind of data the processor needs such as, for example, a bit sequence or individual characters.

SUMMARY

Aspects of an embodiment of the present invention include an approach for modifying a register located within a central processing unit with a preservation bit, wherein the preservation bit designates when the register is to be preserved. A preservation bit is activated. A preservation bit requests a subroutine to access content held on the register. A register is pushed to a memory source. The bitmask is pushed to a memory source, wherein the bitmask contains information regarding the content pushed to the memory source. The bitmask is popped, at the request of the subroutine, to determine that that content is to be popped. The content is popped from the memory source to the register. The content is returned from the subroutine.

DETAILED DESCRIPTION

As will be appreciated by one skilled in the art, aspects of the present invention may be embodied as a system, method or computer program product. Accordingly, aspects of the present invention may receive the form of an entirely hardware embodiment, an entirely software embodiment (including firmware, resident software, micro-code, etc.) or an embodiment combining software and hardware aspects that may generally be referred to herein as a "circuit," "module" or "system." Furthermore, aspects of the present invention may receive the form of a computer program product embodied in one or more computer readable medium(s) having computer readable program code/instructions embodied thereon.

Embodiments of the present invention recognize that current CPU design does not account for the information disparity between caller and callee when making calls to subroutines in machine code. The term "information disparity" refers to the fact that the caller only knows which register(s) the caller needs preserved, while the callee only know which register(s) the callee will use. Generally, the caller and the callee do not know the additional piece of information, thus creating an information disparity.

Embodiments of the present invention help reduce the necessity of stack access at the caller/callee boundary without introducing leakage of information across that boundary. Embodiments of the present invention add a cooperative aspect between a function caller and callee to optimize register preservation without involving information leakage across the interface.

Embodiments of the present invention disclose a method, computer program product, computer system, and apparatus to provide a more efficient register preservation on a processor. In some embodiments, CPU design changes are present with instructions to add a cooperative aspect between the function caller and callee.

The present invention will now be described in detail with reference to the Figures.

Figure 1:
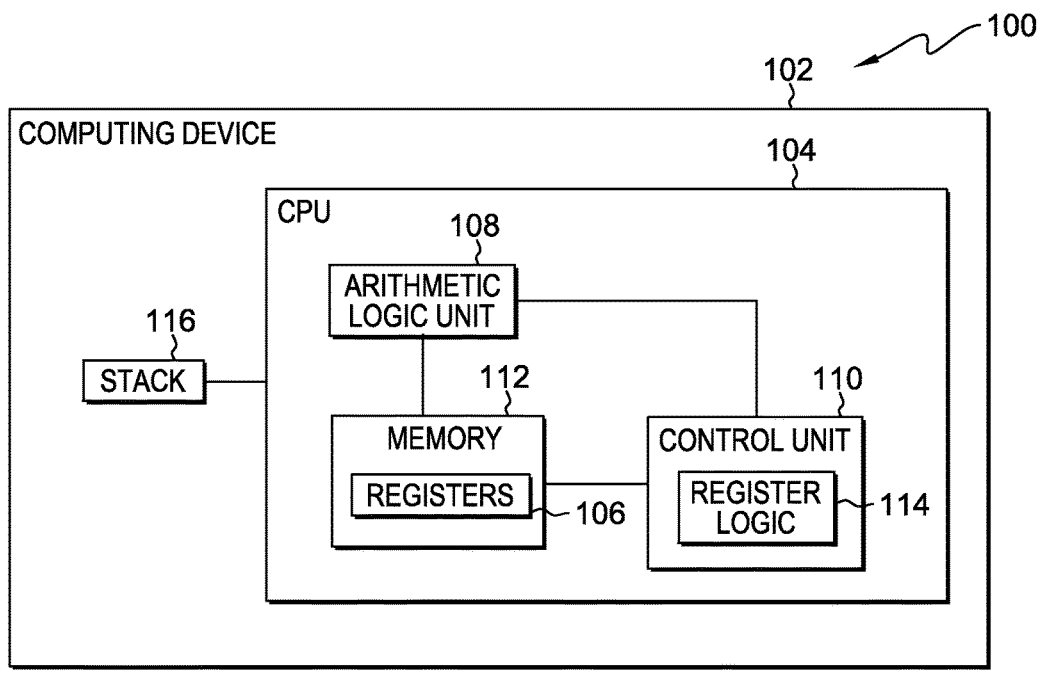
FIG. 1 depicts a block diagram of a computing environment, in accordance with one embodiment of the present invention.

FIG. 1 depicts a block diagram of computing environment 100 in accordance with one embodiment of the present invention. FIG. 1 provides an illustration of one embodiment and does not imply any limitations regarding computing environment 100 in which different embodiments maybe implemented. In the depicted embodiment, computing environment 100 includes computing device 102. Computing environment 100 may include networks, computing devices, servers, computers, components, or additional devices not shown.

Computing device 102 may be a desktop computer, laptop computer, tablet computer, personal digital assistant (PDA), or smart phone. In general, computing device 100 may be any electronic device or computing system capable of processing program instructions, and sending and receiving data. In the depicted embodiment, computing device 102 includes CPU 104 and stack 116. Computing device 102 may include components, as depicted and described in further detail with respect to FIG. 3.

CPU 104 operates as one or more central processing units of computing device 102 and includes registers 106, arithmetic logical unit 108, control unit 110, memory 112. In other embodiments, CPU 104 can include fewer or additional elements and/or components (not present). In some embodiments, CPU 104 has a larger quantity of memory 112, by increasing the amount of registers 106, or more cache memory to allow for a greater amount of storage.

Arithmetic Logic Unit (ALU) 108 is a digital circuit that performs arithmetic and bitwise logical operations on integer binary numbers. ALU 108 may function as the center core of CPU 104 at which calculations and comparisons are performed. ALU 108 may execute arithmetic and logical operations, pattern matching operations, and shift and extract operations on data received. In some embodiments, ALU 108 may include various components to perform the operations described above. In the depicted embodiment, ALU 108 is located on CPU 104.

Control unit 110 is a component of CPU 104 that directs operations of CPU 104. Control unit 110 communicates with arithmetic logic unit 108, memory 112, and input and output devices on how to respond to a program's instructions. Some of these instructions provide the capability to return control to a point following the first instruction, and may additionally provide the capability to preserve and restore aspects of the state of the program at the time of the instruction. In one embodiment, a caller saves the current preservation settings of registers 106, and a callee saves the registers 106 that are marked to be preserved to stack 116 and clears the preservation bit for registers 106 that are saved. In one embodiment, the caller saves the current preservation settings of registers 106 onto stack 116 and marks the registers 106 as persevered, the caller saves the instructions address onto stack 116 and the caller transfers control to the callee. Stack 116 is a slower form of memory in the hierarchy of memory access speeds. Other forms of memory may include, for example, hard drives, random-access memory (RAM), cache, and additional forms of tangible memory sources. The caller pops a value by restoring that value from the top of stack 116 into a register. When a register is saved to stack 116 the callee requests the register be removed from stack 116. Control unit 110 may regulate and integrate operations of CPU 104 by selecting and retrieving instructions from memory 112 in the proper sequences, and interpreting those instructions so as to activate additional functional elements of CPU 104 at appropriate times to perform their respective operations. In the depicted embodiment, control unit 110 is located on CPU 104.

A subroutine is a sequence of program instructions forming a unit that performs a specific task. The unit can be used in programs wherever that particular task should be performed. The content of a subroutine is the piece of program code that is to be executed when the subroutine is called by the caller. The subroutine may also return a computed value to the subroutine's caller by the callee. A common use of subroutines is to implement a mathematical function, in which the purpose of the subroutine is purely to compute one or more results whose values are determined by the parameter passed to the subroutine.

Memory 112 is computer readable storage media. Memory 112 can include any suitable volatile or non-volatile computer readable storage media. In the depicted embodiment memory 112 is located on CPU 104. In other embodiments, memory 112 can be located externally.

Stack 116 is an area of memory where data is added and removed in a last-in-first-out manner. Stack 116 is a data structure that stores information about the active subroutine of a computer program. In the depicted embodiment, stack 116 is located in computing device 102 and is not located on CPU 104. In other embodiments, stack 116 is located on CPU 104. Stack 116 is a system provided and managed area of storage where the caller or callee can, either as part of the call/return process or via a separate means, save or retrieve program state information.

Registers 106 are an amount of storage available as part of CPU 104. Registers 106 temporarily store data that is being processed by CPU 104. Registers 106 can be in the form of, but are not limited to, data registers, address registers, general purpose registers, constant registers, instruction registers, memory buffer register, memory data registers, memory address registers, or any additional forms of registers that can operate within CPU 104. In one embodiment, registers 106 are made of static or dynamic random access memory (RAM) cells. In the depicted embodiment, registers 106 are located on CPU 104

Register logic 114 uses information in the caller/callee interface to only save registers to the stack at the latest possible time, and only when necessary. Register logic 114 adds extra information for registers 106 in the form of a preservation bit. A preservation bit is a part of registers 106 that informs CPU 104 to preserve those registers 106 as needed. The preservation bit operates in an on/off function, where register logic 114 determines if registers 106 is preserved or not. If registers 106 are to be preserved, register logic 114 "turns on" the preservation bit. In one embodiment, the caller sets the preservation bit as part of the modified subroutine interface. Once the preservation bit is turned on, the preservation bit is checked by the callee, and the callee modifies the preservation bit which are set for a register that is included in the set of registers 106 that are persevered on the stack for the call function. In other embodiments, once the preservation bit is turned on, a request comes from a higher or lower level caller to higher or lower level callee. In one embodiment, register logic 114 is a series of instructions to be used in conjunction with, or to replace, the current subroutine call instructions. When a subroutine determines to return registers 106, the subroutine pops the saved address off the stack 116 and continues executing from the new location. In the depicted embodiment, register logic 114 is part of control unit 110. In other embodiments, register logic 114 can be controlled by additional components or elements of CPU 104 that are not present.

Figure 2:
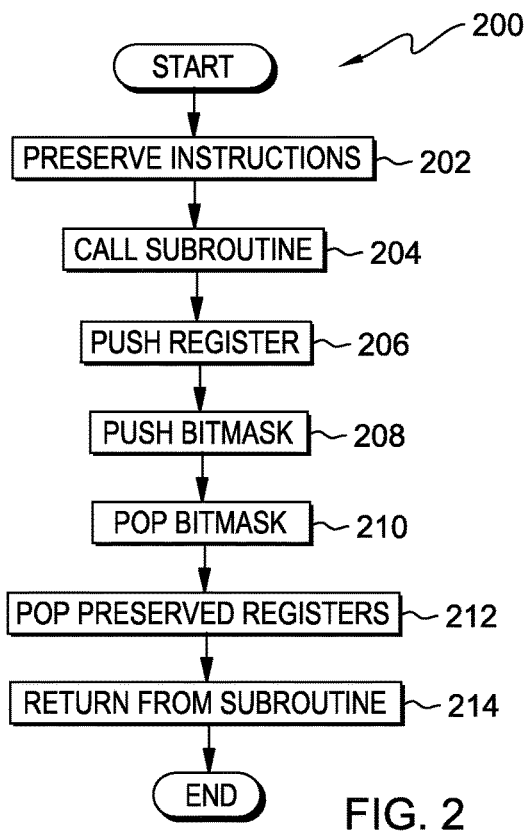
FIG. 2 is a flowchart depicting operations for preserving and restoring registers on a computing device executing within the computing environment of FIG. 1, in accordance with one embodiment of the present invention.

FIG. 2 depicts a flowchart 200 of the steps of sending information between registers 106, ALU 108, and control unit 110 within computing environment 100 of FIG. 1, in accordance with an embodiment of the present invention. Flowchart 200 depicts the selecting, marking, and sending of data from registers 106 to the stack 116, and the popping the data to registers 106 from stack 116 when the data is indicated.

In step 202, register logic 114 preserves instructions to be performed on registers 106. Register logic 114 adds extra information for registers 106 in the form of a preservation bit. When register 106 are pushed, the perseveration bit is saved in stack 116. The added information of the preservation bit is stored in registers 106 and is set and cleared, as described by the steps below, when data is transferred between registers 106 and stack 116. The preservation bit is added to registers 106 to mark which of registers 106 is preserved. In one embodiment, a preservation bit can be any number of bits, as long as the rest of the computer architecture, integers, memory addresses, or other data units are an equal bit width. A preservation bit is usually one bit, but can be any number of bits, so long as CPU 104 is compatible with the preservation bit. In other embodiments, a preservation bit may be any bit width regardless of computer architecture, integers, memory addresses, or other data bit width. In one embodiment, a preservation bit may be an internal bit of CPU 104. In other embodiments, the preservation bit is an additional bit added to CPU 104. When registers 106 are marked with a preservation bit and register logic 114 sets the preservation bit to true, the registers 106 are marked for preservation. It is not necessary for registers 106 to be subject to preservation and the addition of the preservation bit, rather a quantity of registers 106 can be marked with the preservation bit.

In step 204, register logic 114 calls the subroutine. Register logic 114 communicates directly with the preservation bits to gain access to the preservation information in registers 106 to determine which preservation bits are activated. Register logic 114 uses the information in the caller/callee interface to determine which pieces of information are stored in stack 116, instead of storing the information in registers 106. Due to certain registers 106 being marked with the preservation bit, CPU 104 save the certain registers 106 when the certain registers 106 are accessed during the subroutine's process, and periodically the subroutine executes the process. Register logic 114 performs the selection process by only saving registers that both the caller has deemed must be preserved, and the callee has indicated the callee changes within the subroutine's process.

In step 206, control unit 110 pushes one of registers 106 that have been marked by register logic 114. Once registers 106 are marked by register logic 114 as preserved, register logic 114 pushes registers 106 that are preserved and their previous preservation information to stack 116. In other embodiments, register logic 114 pushes registers 106 that are marked to be preserved to a different location, or divides up registers 106 that are marked for preservation to a multitude of locations including, but not limited to, stack 116 and/or additional storage locations. In one embodiment, registers 106 that are not marked for preservation are not pushed. In other embodiments, a quantity of registers 106 that are not marked for preservation are pushed to a storage location such as, but not limited to, stack 116.

In step 208, control unit 110 pushes a bitmask as to which registers 106 were preserved. The bitmask indicates registers 106 that are preserved and registers 106 that are not preserved, and is used by register logic 116 to determine which registers 106 are pushed and popped by caller/callee. In one embodiment, the bitmask is not a bit but another piece of data that CPU 104 and register logic 116 are compatible with. In one embodiment, the bitmask is pushed to stack 116 where registers 106 are pushed, and remains at stack 116 until the subroutine needs to determine if registers 106 are preserved and if they need to be popped. In other embodiments, control unit 110 pushes the bitmask to any storage location in which register logic 114 has access to bitmask, and bitmask is accessible to register logic 114.

In step 210, control unit 110 pops the bitmask off stack 116 to determine which registers 106 were pushed. Control unit 110 instructs the subroutine to pop the bitmask off stack 116 to see which registers 106 were pushed and analyzes the information regarding which registers 106 were pushed to determine which registers 106 are bypassed or popped. The register logic 114 uses the information to determine which registers 106 is bypassed in future steps, or if registers 106 is popped from stack 108.

In step 212, register logic 114 pops registers 106 that were marked as preserved in the bitmask. Register logic 114 determines which registers 106 to pop from stack 116 based on the information included in the bitmask. If registers 106 are not listed in the bitmask as being preserved, the not listed registers of registers 106 are bypassed by register logic 114 and are not popped or moved from their current location. In one embodiment, register logic 114 pops a quantity of registers 106 from bitmask that are preserved and pops a quantity of registers 106. In one embodiment, register logic 114 pops registers 106 regardless of being listed in bitmask.

In step 214, register logic 114 returns one of registers 106 from the subroutine. Register logic 114 returns one of registers 106 from the subroutine, register logic 114 alters the preservation setting to inactive. In one embodiment, register logic 114 incorporates a quantity of registers 106, adds to the current list of registers 106 that are preserved when calling subroutines, and restores the previous state of registers 106 on return, which allows registers 106 to be preserved at one level of stack 116, remain used at the next levels of stack 116, and finally be saved at a lower level, if registers 106 are to be preserved. Register logic 114 processing may greatly reduce the amount of read and write operations to and from stack 116. Register logic 114 may enable the flow of information from caller to callee with the use of minimal memory.

In another embodiment, register logic 114 protects registers 106 that are preserved from corruption. When registers 106 are preserved and the modifications are made to registers 106 by control unit 110, the modification to registers 106 results in a failure of the program. CPU 104 and register logic 114 create a block for registers 106 that are marked as preserved so registers 106 cannot be modified until they are correctly popped by the subroutine. In several embodiments, such a block can be in the form of a read only setting on those registers 106 or a security setting blocking those registers 106.

Figure 3:
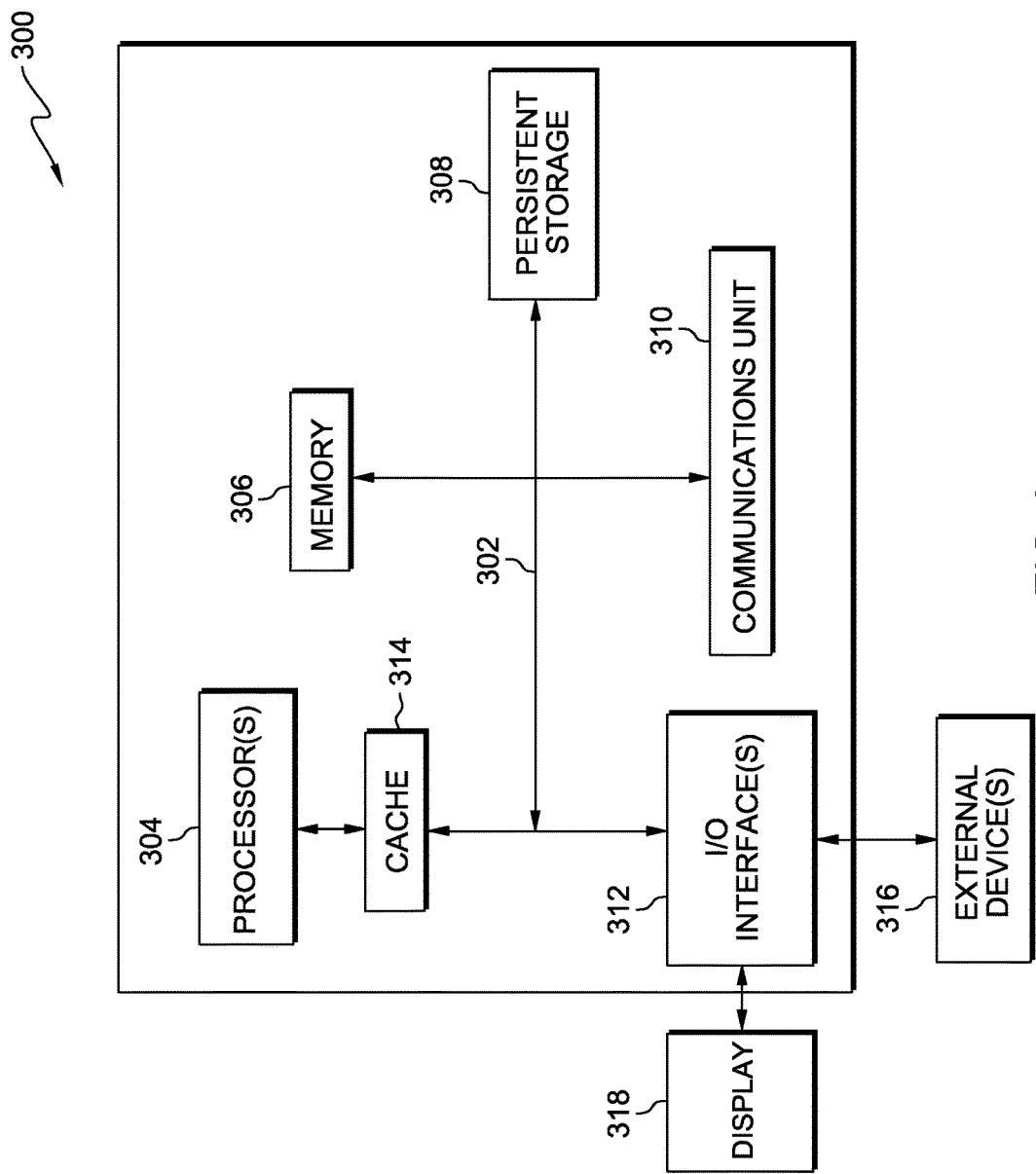
FIG. 3 is a block diagram of internal and external components of the computing device of FIG. 1, in accordance with one embodiment of the present invention.

FIG. 3 depicts a block diagram 300 of components of computing device 102, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 102 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any additional hardware components within a system. For example, communications fabric 302 can be implemented with one or more buses.

Memory 306 and persistent storage 308 are computer readable storage media. In one embodiment, memory 306 includes random access memory (RAM) and cache memory 314. In general, memory 306 can include any suitable volatile or non-volatile computer readable storage media.

Arithmetic logic unit 108, and control unit 110 may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in the examples, provides for communications with other data processing systems or devices, including computing device 120. In the examples, communications unit 310 includes one or more network interface cards. Communications unit 310 may provide communications through the use of either or both physical and wireless communications links. Programs may be downloaded to persistent storage 408 through communication unit 410.

I/O interface(s) 312 allows for input and output of data with other devices that may be connected to computing device 120. For example, I/O interface 312 may provide a connection to external devices 316 such as a keyboard, keypad, camera, a touch screen, and/or some other suitable input device. External devices 316 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 of computing device 120 via I/O interface(s) 312. I/O interface(s) 312 also connect to a display 318.

Display 318 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for locating, preserving, and receiving registers, the method comprising:
   modifying a register located within a central processing unit with a preservation bit, wherein the preservation bit designates when the register is to be preserved;
   activating the preservation bit of the register;
   requesting a subroutine to access content held in the register;
   pushing the content to a memory source;
   pushing a bitmask to the memory source, wherein the bitmask contains information regarding the content pushed to the memory source;
   popping the bitmask, at the request of the subroutine, to determine that that content is to be popped;
   popping the content from the memory source to the register; and
   returning from the subroutine.

2. The method of claim 1, wherein the step of returning from the subroutine occurs subsequent to the step of popping the content from the memory source to the register.

3. The method of claim 1, further comprising:
   implementing security to protect the register from being improperly modified upon activating the preservation bit of the register.

4. The method of claim 1, further comprising:
   determining that a function caller and a function callee have identified the register must be preserved, wherein the function caller and the function callee are elements of an interface within the subroutine.

5. The method of claim 4, wherein the function caller and the function callee identify the register must be preserved by recognizing an active preservation bit of the register.

6. The method of claim 1, wherein pushing the content to the memory source comprises:
   pushing the content to the memory source in a read-only format.

7. The method of claim 1, wherein the information regarding the content pushed to the memory source comprises, at least, activation state of the preservation bit, additional previously preserved registers, and locations of the additional previously preserved registers.

* * * * *